March 23, 1943. O. J. POUPITCH 2,314,368
FASTENER DEVICE
Filed April 8, 1942
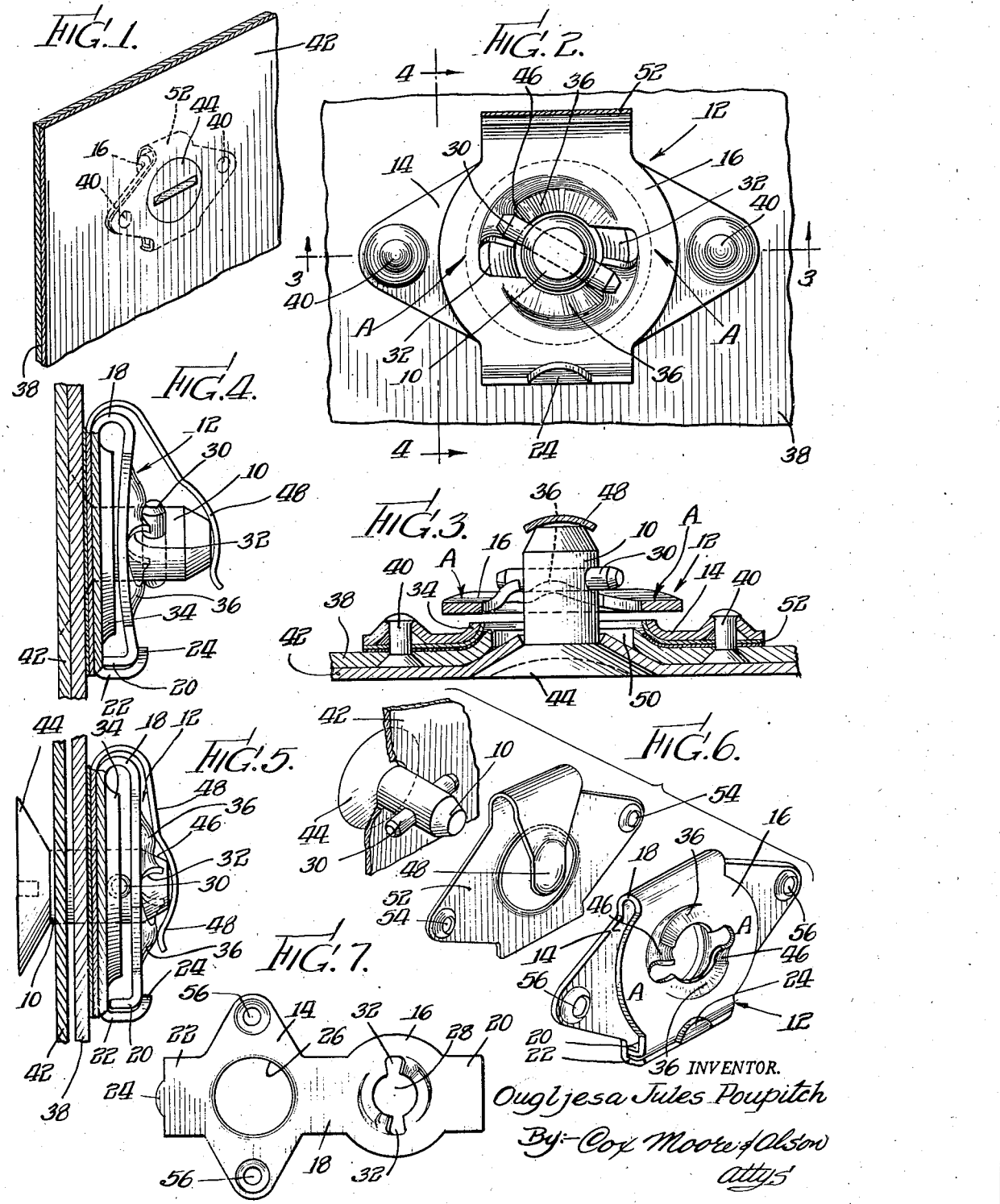
INVENTOR.
Ougljesa Jules Poupitch
By: Cox, Moore & Olson
attys Patented Mar. 23, 1943

2,314,368

UNITED STATES PATENT OFFICE 2,314,368

FASTENER DEVICE

Ougljesa Jules Poupitch, Chicago, Ill., assignor to Illinois Tool Works, Chicago, Ill., a corporation of Illinois Application April 8, 1942, Serial No. 438,203

5 Claims. (Cl. 85—5)

This invention relates generally to fasteners particularly adapted for detachably coupling cowling parts and the like.

The fastener devices contemplated by the present invention are of the type which employ a locking stud member designed to be telescopically associated with a perforated sheet metal locking element. In certain of these devices the stud member is provided with a cross pin which during the initial association and final disassociation of the parts must register with complementary openings in the sheet metal locking element. It is an important object of the present invention to facilitate disengagement of a locking stud from a sheet metal locking member and the invention contemplates the provision of simple and durable means for accomplishing that end.

More specifically, the invention contemplates a fastener as set forth above wherein means for automatically ejecting a stud member is operatively associated with the sheet metal locking part to resiliently act upon and thereby eject the stud member.

Another object of the present invention is to provide detachable spring means adapted to be held in position by the above mentioned sheet metal locking part, said spring means serving to effect the automatic ejection of a stud member.

It is a further object of the present invention to provide a fastener of the type referred to above wherein the means or spring for ejecting the stud member is adapted to engage the inner or free extremity of the stud member and to constantly urge said stud member axially toward its position of disengagement.

The invention also contemplates a sheet metal locking plate of improved practical construction wherein a base plate is superimposed by a locking plate having a central resilient portion adapted to be flexed when a locking stud is tightened in position.

The foregoing and other objects and advantages will be apparent from the following detailed description when considered in connection with the accompanying drawing, wherein:

Figure 1 is a perspective view of a fragmentary section of cowling equipped with a fastener of the type contemplated by the present invention, the sheet metal part of the fastener being indicated by dotted lines;

Figure 2 is an elevational view of the fastener as viewed from the left of Figure 1, the stud ejecting spring being broken away to expose parts otherwise hidden;

Figure 3 is a horizontal central sectional view taken substantially along the line 3—3 of Figure 2;

Figure 4 is a vertical sectional view taken substantially along the line 4—4 of Figure 2 showing the sheet metal fastener partly in section and partly in elevation;

Figure 5 is a figure similar to Figure 4 disclosing the stud member ejected from the sheet metal fastener as a result of the action of the ejecting spring member;

Figure 6 is a perspective view of the parts in exploded relation to more clearly illustrate their structural details; and Figure 7 is a plan view of the blank before it has been folded.

Referring now to the drawing more in detail, it will be seen that like numerals have been employed throughout the various figures to denote similar parts. The invention contemplates a fastener comprised of two main parts, to-wit, a locking stud member or part 10 and a sheet metal locking part designated generally by the numeral 12. The sheet metal locking part 12 includes a base plate or section 14 and a locking section or plate 16 formed integral therewith. The locking plate section 16 superimposes the base plate 14 and is integrally connected with the base plate by a connecting or spacing section 18. This spacing section 18 at one margin of the locking plate 16 cooperates with a spacing section or flange 20 provided along the opposite margin of the plate to secure said plate in spaced relation with respect to the base 14. An extension 22 of the base plate 14 overlies the spacing flange 20 and a central portion or tab 24 of the extension 22 actually superimposes or overlies a portion of the plate 16. This arrangement prevents spreading and dislodgement of the plate 16 in that vicinity.

The base plate 14 is provided with a central aperture 26 and the locking plate 16 is provided with a central aperture 28 for receiving the stud member 10. The stud 10 carries a cross pin 30, the extremities of which project radially from the periphery of the stud. The plate 16 is provided with diametrically disposed radial recesses 32 for accommodating the extremities of the cross pin 30. The diameter of the aperture 26 in the plate 14 is sufficient to permit passage therethrough of the cross pin 30, and this aperture is defined by an annular shoulder or flange 34 extending laterally from the plane of the base plate 14 toward the locking plate 16. The function of this flange or abutment 34 to prevent complete flattening of the locking plate 16 will be more apparent as the description progresses.

It will be observed that the central portion of the locking plate 16, namely, the areas indicated by the letter A in Figure 2, is resilient. The radial recesses 32 extend transversely of the medial part of the locking plate, leaving only the resilient plate portions designated by the letter A. These recesses 32, in addition to accommodating the cross pin 30, serve to separate the locking plate into two sections, each of said sections being provided with cam surfaces 36. In the disclosed embodiment these cam surfaces 36 are formed by drawing the metal of the plate outwardly during the stamping operation and each cam surface increases in height as it is folded in a counterclockwise direction, see Figure 2.

The sheet metal locking section 12 may be secured to a work piece 38 by means of suitable rivets 40 and the stud member is carried by a detachable work or cowling part 42. It will be noted that the work piece 42 is preferably countersunk, Figure 3, to receive the head 44 of the stud 10. In assembling the stud with the work piece 42, the shank thereof is first passed through the aperture in the countersunk portion of the plate and then the cross pin 30 is driven in place within the stud shank. Thus, the stud cannot be completely withdrawn from the plate 42 without first removing the pin, although the stud may be shifted axially within limits determined by the distance between the head 44 and the cross pin 30.

When the stud is initially associated with the sheet metal locking member 12, the cross pin 30 registers with the radial slots or recesses 32 and the pin is inserted a sufficient distance to just clear the upper plane of the locking plate 16. Rotation of the stud in a counterclockwise direction, as viewed in Figure 2, causes the cross pin to approach the high point of the cam and thereby bring about a deflection in the locking plate. After the pin has passed the high point of the cam it comes to rest within an indentation 46. This is the position shown in Figures 2, 3 and 4. The central portion of the plate 16 being resilient enables the entire plate to experience a deflection as indicated in Figure 4, thereby setting up powerful locking engagement with the cross pin 30. The annular abutment 34 functions to prevent deflection of the plate 16 beyond a given amount and thus prevents the locking plate from being subjected to any structural set.

It will be apparent from the foregoing description that the spacing sections 18 and 20 function as substantially rigid supports for the flexible plate 16. By employing these substantially rigid spacing sections 18 and 26 any shortening of the distance between the sections which may result from the flexing of the plate 16 is compensated for. That is to say, the spacing flange 20 is free to slide along the surface of the base plate 14 and thus prevent any deleterious stresses from being imparted to the fastener stock. To loosen the stud it is only necessary to impart retrograde rotation in a clockwise direction, as viewed in Figure 2 until the cross pin 30 registers with the recesses 32.

In order to insure complete disengagement of the cross pin from the locking plate 16 an ejector spring 48 is employed. The free extremity of this spring 48 constantly bears against the extremity of the stud 10. Thus when the cross pin 30 moves into registration with the recesses 32, the spring 48 functions to immediately shift or eject the stud to the position shown in Figure 5. The cowling part 42 may now be moved away from the work piece 38, the cross pin 30 passing through the aperture 26 in the base plate 14 and a companion aperture 50 provided in the work piece 38, Figure 3.

The ejector spring 48 in the disclosed embodiment of the invention, and as clearly illustrated in Figure 6, includes the spring proper which forms an extension of a base plate 52. The plate 52 is provided with apertures 54 which register with complementary apertures 56 of the base plate 14. Thus the rivets 40 serve not only to secure the base plate 14 in place but also the base plate 52 which supports the ejector spring 48. Both the ejector spring 48 and the sheet metal locking device 12 are preferably formed from spring tampered sheet metal capable of being subjected to continuous vibratory forces over an extended period of time without experiencing the slightest degree of fatigue.

From the foregoing it will be apparent that the present invention contemplates the provision of a fastener for cowlings and the like which is extremely simple in construction and efficient in operation. It will also be apparent from the foregoing description that the locking plate 16 may be flexed without subjecting the rivets 40 to any stress. This should be distinguished from cowl fasteners of the type wherein the flexing of one portion of the fastener stock tends to subject the holding rivets to shearing stresses. It will also be noted that the ejector spring 48 provides a very effective means for positively insuring the disengagement of the cross pin from the locking plate immediately upon registration of the pin with the radial recesses. The base of the sheet metal locking structure 12 provides an effective means for clamping the spring support in position upon the work piece. By having the force exerted by the ejector spring directed axially against the inner extremity of the stud, complete disengagement or ejection of the stud from the locking plate is assured.

Mention has been made of the resilient characteristics of the intermediate portion of the locking plate 16, and this area has been designated by the letter A. In order to assure proper flexing of the plate, the cams 36 have been disposed so as to extend in a general transverse direction between the side margins or edges of the plate. By having these cams so disposed, maximum resiliency in the plate for locking purposes is obtained. This disposition of the cams enables them to retain their desired rigidity during the flexing of the locking plate without being subjected to the tendency to bend or to become distorted as a result of the flexing of the locking plate.

While certain structural details have been disclosed herein to illustrate one practical embodiment of the invention, it will be apparent that the invention contemplates other modifications and changes without departing from the spirit and scope of the appended claims.

The invention is hereby claimed as follows:

1. A sheet metal fastening device having a portion adapted to be secured to a support, a locking section normally spaced from the plane of said first mentioned portion and centrally apertured to accommodate a rotary stud equipped with oppositely disposed lateral lugs and carried by a member adapted to be detachably associated with said support, the material of the locking section in the vicinity of said central aperture being outwardly stressed to provide arcuate cam surfaces projecting outwardly beyond the surface of the locking section stock for cooperation with said lateral lugs, and a sheet metal stud ejecting spring element having a free extremity positioned externally of said cam surfaces.

2. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a stud ejecting spring positioned externally of said cam surface.

3. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a detachable stud ejecting spring positioned externally of said cam surface.

4. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a spring member extending from one margin of the locking plate across the central portion thereof in a position to engage the free end of an associated stud member.

5. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a spring member including a base portion adapted for detachable mounting beneath the first mentioned base portion and a stud ejecting section having a free extremity for cooperation with a stud member.

OUGLJESA JULES POUPITCH.